United States Patent Office 3,606,477
Patented Sept. 20, 1971

3,606,477
APPARATUS FOR THE FLAT LAYING OF STOCKINGS
Nels Hartmann Sorensen, Holte, Denmark, assignor to Hans Christian Anderson, Kastanienbaum, Switzerland
Filed Dec. 9, 1969, Ser. No. 883,399
Claims priority, application Denmark, Dec. 10, 1968, 6,039
Int. Cl. B65g 47/36, 47/42
U.S. Cl. 302—2R     5 Claims

ABSTRACT OF THE DISCLOSURE

An apparatus for the flat laying of stockings in which the stockings are conveyed by a flow of air to one end of an elongated container, a guide means being provided at that end of the container to guide the stocking in an upwardly inclined path towards a gripping needle at the top wall of the container, while permitting the bulk of the stocking to continue its movement through the container so as to be straightened by a direct continutaion of the flow of air by means of which the stocking was conveyed to the container.

BACKGROUND OF THE INVENTION

This invention relates to an apparatus for the flat laying of stockings, i.e. in which stockings are straightened and subsequently deposited in receptacles in a straightened state.

Such an apparatus is useful at many stations in a stocking manufacturing or processing factory where it is desirable that the stockings, after having been subjected to a manufacturing or checking operation, or after conveyance from one station to another, should be deposited in a relatively straightened-out state in regular and uniform bundles, e.g. in a collecting tray or basket.

More particularly, the invention relates to an apparatus of the type comprising an elongated container, means for producing a flow of air to convey stockings one at a time, one end frontmost, to said container, means for gripping the leading end of a stocking conveyed to the container, means for producing a flow of air along a straightening path longitudinally through said container to straighten said stocking following the gripping of its leading end, and means for stopping said longitudinal flow of air, for releasing said gripping means and for opening up the bottom wall of said container to permit a stocking straightened therein to drop into a stocking collecting receptacle placed in position under said container.

In a known apparatus of the type referred to, the gripping member is mounted on a holding member provided adjacent the receiving end of the container, which holding member, upon receiving the leading end of a stocking under the influence of the conveying flow of air, is moved aside, whereupon a new flow of air is started to straighten the stocking in the container.

In another known apparatus of the type in question, the gripping member is provided at the remote end of the container, and after the stocking has been conveyed through the whole length of the container to the gripping member under the influence of the conveying flow of air, the stocking is straightened in the container by means of a flow of air in the opposite direction.

Thus in both cases the straightening of the stockings takes place in two stages between which a series of control operations have to take place. These take time and tend to complicate the construction of the apparatus.

SUMMARY OF THE INVENTION

According to the invention, in an apparatus of the type referred to, said gripping means is arranged at one wall of said container in a position adjacent the stocking receiving end of said container, means being provided for guiding a stocking received in said container in an inclined path towards said gripping means, said guiding means being constructed to permit the bulk of said stocking to escape into the portion of said box at the distal side of said gripping means, said air flow producing means being so arranged that said straightening flow of air through said container forms a direct continuation of the flow of air conveying a stocking to the container.

In this manner, the straightening of the stockings takes place in one continuous operation, whereby the constructional arrangement of the apparatus can be considerably simplified. Besides, a very efficient gripping of the leading end of the stocking can be obtained by means of a simple gripping member because the flow of air serving to hook the stocking end on the gripping member is continued during the whole of the straightening operation.

DESCRIPTION OF THE PREFERRED EMBODIMENTS

In FIGS. 1-4, 1 is an elongated container of rectangular cross sectional shape and constructed with a bottom 2, which is pivotably connected with one side wall 3 of the container by means of a hinge 4.

A stocking supply tube 5 extends into the container at one end thereof, which supply tube may be connected with a machine or another stocking supply source, from which the stockings are conveyed through the tube 5 into the container by means of a conveying flow of air.

Figure 2:
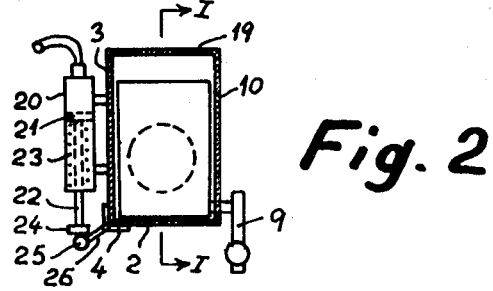
Figure 3:
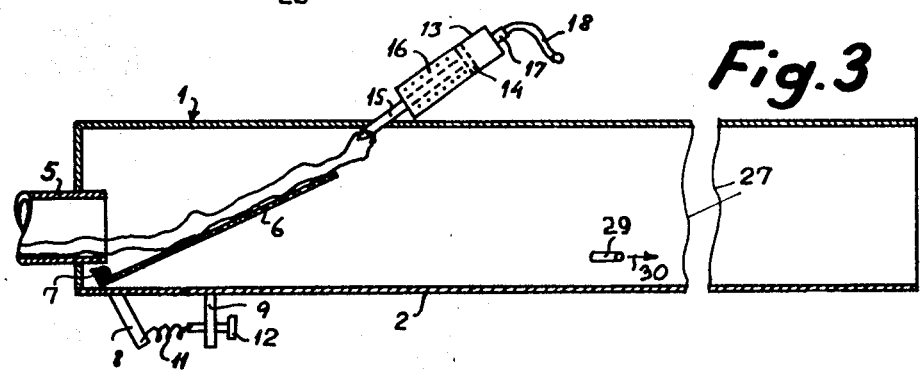

6 is a substantially rectangular flap, see FIG. 2, which at its lower edge is connected with a pin 7 pivotably mounted in the side walls of the container. A rocking arm 8 is connected to an end portion of the pin 7 extending out of the container. A tension spring 11 is connected between the arm 8 and a bracket 9 attached to the other side wall 10 of the container, an adjustment screw 12 being provided between the spring 11 and the bracket 9.

A pneumatic cylinder 13 with a piston 14 is mounted on the upper wall of the container. The piston 14 carries a needle 15, which extends out of the cylinder 13. The piston is biased by means of a compression spring 16. The end of the cylinder 13 remote from the container is connected with a compressed air conduit 18 via a fitting 17. When compressed air is supplied to the cylinder, the needle 15 is pushed forwards through the top wall 19 of the container into the interior of the container as illustrated in the drawing. When the cylinder is vented, the spring 16 withdraws the needle 15 to a position entirely outside the container.

For the opening and closing of the bottom 2 a pneumatic cylinder 20 provided with a piston 21 is attached to the side wall 3 of the container. A compression spring 23 is provided around of the piston rod 22 of the piston 21. The extending lower end of the piston rod is provided with a presser foot 24 engaging a roller 25 on an arm 26 rigidly connected with the bottom of the container.

Figure 1:
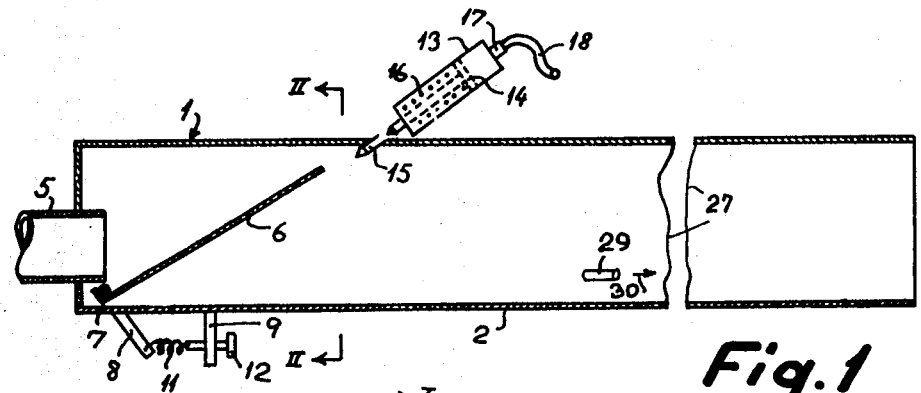
FIG. 1 shows diagrammatically an apparatus according to one embodiment of the invention in longitudinal section along the line I—I, FIG. 2, the apparatus being shown in its neutral position, FIG. 2 a section along the line II—II, FIG. 1, FIG. 3 a view similar to FIG. 1, but with the parts in the position, which they assume immediately upon arrival of a stocking, FIG. 4 a similar view of the apparatus in a subsequent phase of the flat laying operation, FIG. 5 an apparatus according to a second embodiment of the invention in longitudinal section, and FIG. 6 on an enlarged scale, a detail of the apparatus of FIG. 5, in side view and partly in section.

As indicated by the fraction lines 27 in FIG. 1, part of the container is removed in the drawing. At some distance from the flap 6 an ejector 29 is provided, through which air may be blown into the container as indicated by the arrow 30 in a direction towards the end of the container remote from the tube 5.

Figure 4:
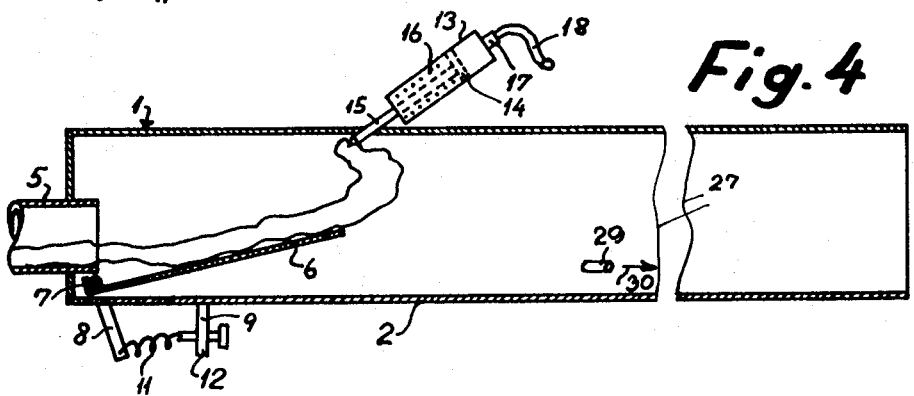

In the neutral state of the apparatus, the parts assume the positions shown in FIG. 1, i.e. the flap 6 is held by the spring 11 in the illustrated upwardly inclined position and the needle 15 is held in its advanced position by the supply of compressed air to the cylinder 13. The bottom 2 is kept in its closed position by the supply of compressed air to the cylinder 20. A conveying flow of air flows through the supply tube 5 and continues through the whole length of the container. When a stocking is conveyed to the container through the supply tube 5 by means of the conveying air flow, the leading end of the stocking, ordinarily its toe end, strikes the flap 6 and slides along this in an upwardly inclined path. Owing to the momentum of the stocking the flap yields slightly and is thereby turned downwards, whereby the leading end of the stocking is guided towards the needle 15 and is gripped by this needle. When the leading end of the stocking has reached the needle 15, the trailing portion of the stocking exerts an increased force on the flap, whereby this is turned further downwards, as illustrated in FIG. 4. At the same time the stocking bridges the increasing free space between the top wall 19 of the container and the free edge of the flap 6, whereby this portion of the stocking is blown into an arcuate shape as illustrated in FIG. 4. In this manner the trailing portion of the stocking is kept away from the needle 15 and escapes rapidly beyond the edge of the flap 6, whereupon it is straightened in the longitudinal direction of the container. If necessary, air may be blown through the ejector 29 to support the conveying air flow. Now the supply of compressed air to the tube 5, the needle cylinder 13 and the bottom operating cylinder 22 is interrupted, whereby the needle 15 is withdrawn to release the stocking end. Since the supply of conveying air through the tube 5 is interrupted, the stocking remains in its straightened state and drops through the bottom 2, the latter being turned downwards under the influence of the spring 23 of the piston 25.

The stockings are in known manner collected in a collecting tray or basket or the like placed under the container 1.

The movement of the flap 6 depends on the conditions in each individual case, particularly on the velocity of the conveying air and the weight of the stocking. A heavier stocking will cause the flap 6 to turn downwards more rapidly. In order to compensate for such influences the adjustment screw 12 is provided so that the resistance offered by the spring 11 to the turning of the flap 6 can be so adjusted that under the conditions prevailing in each individual case the leading end of the stocking will accurately hit the needle 15.

Figure 5:
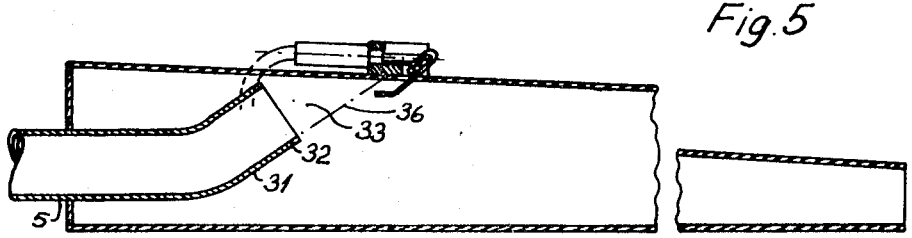
Figure 6:
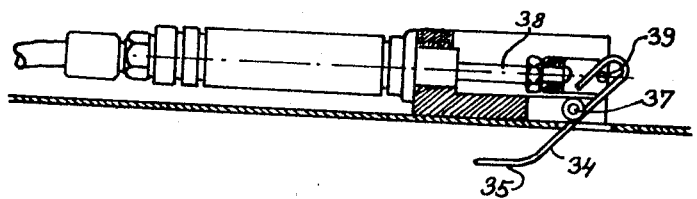

In the modification illustrated in FIGS. 5 and 6 the supply tube 5 extends further into the container 1 and has an upwardly inclined end portion 31, the edge 32 of which is so shaped as to leave sufficient space 33 between the upper wall of the container and the said edge to permit a stocking to escape past the said edge. Thus, the end portion 31 has the same function as the flap 6 in the first embodiment.

Instead of the reciprocating needle 15 a pivoted blunt needle 34 is used in the embodiments of FIGS. 5 and 6. The needle 34 has an end portion 35 directed towards the supply end of the container substantially parallel to the top wall and serving to grip the leading end of the stocking, the latter striking the top wall immediately in front of the needle as indicated by the dash-dotted line 36 and then being caused to slide onto the needle by the conveying air flow. In this manner the stocking end is caught very softly by the needle.

The needle 34 is pivotably mounted about an axis 37 and is provided beyond said axis 37 with a loop engaged by a transverse pin 39 on a piston rod 38. When the piston rod 38 is withdrawn, the needle is turned downwards so that the end portion assumes a vertical position. At this time the conveying air flow in the container is interrupted and the stocking end can thus slide off the needle with practically no resistance at all.

In all other respects the operation is the same as in the case of the embodiment first described.

I claim:

1. An apparatus for the flat laying of stockings comprising an elongated container, means for producing a flow of air to convey stockings one at a time, one end frontmost, to said container, means for gripping the leading end of a stocking conveyed to the container, means for producing a flow of air along a straightening path longitudinally through said container to straighten said stocking following the gripping of its leading end, and means for stopping said longitudinal flow of air, for releasing said gripping means and for opening up the bottom wall of said container to discharge a stocking straightened therein, characterized in that said gripping means is arranged at one wall of said container in a position adjacent the stocking receiving end of said container, means being provided for guiding a stocking received in said container in an inclined path towards said gripping means, said guiding means being constructed to permit the bulk of said stocking to escape into the portion of said container at the distal side of said gripping means, said air flow producing means being so arranged that said straightening flow of air through said container forms a direct continuation of the flow of air conveying a stocking to the container.

2. An apparatus as in claim 1, in which said guiding means comprises a spring loaded flap, which in its neutral state extends at an inclination substantially from a pivoting axis adjacent one longitudinal wall of the container towards the gripping means mounted on the opposite wall, said flap being resiliently yieldable towards the first mentioned wall.

3. An apparatus as in claim 1, in which said guiding means comprises an end portion of a stocking supply tube, said end portion being directed at an inclination towards said gripping means, the edge of said tube end portion being so shaped as to leave sufficient space between the wall carrying said gripping means, and said edge to permit a stocking to escape past said edge under the influence of the flow of air through said container.

4. An apparatus as in claim 1, in which said gripping means comprises a needle which is reciprocable in a direction substantially parallel to said guiding means.

5. An apparatus as in claim 1, in which said gripping means comprises a blunt needle which is pivotably mounted on the top wall of the container and has an end portion directed towards the supply end of the container substantially parallel to said top wall and adapted to be turned downwards to release a stocking gripped thereby.

References Cited

UNITED STATES PATENTS 3,429,618  2/1969  Sparso et al. _____ 302—2
3,455,124  7/1969  Rossler _____ 302—2X EVON C. BLUNK, Primary Examiner W. S. CARSON, Assistant Examiner U.S. Cl. R.X.

66—147; 214—6R; 223—43